No. 753,975. PATENTED MAR. 8, 1904.
A. A. GOHN.
GAS MIXER.
APPLICATION FILED MAY 9, 1903.
NO MODEL.
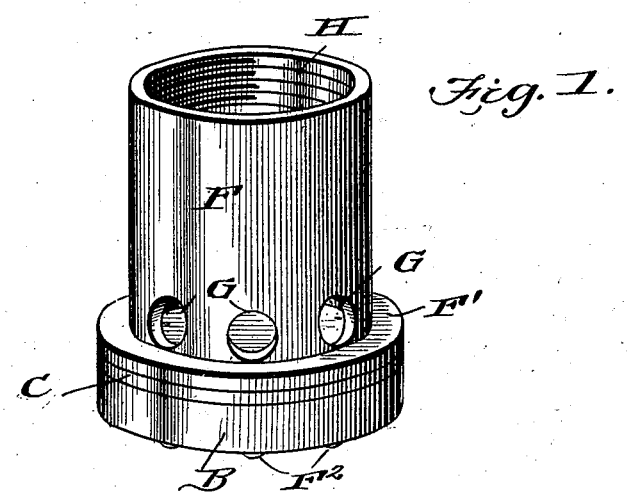
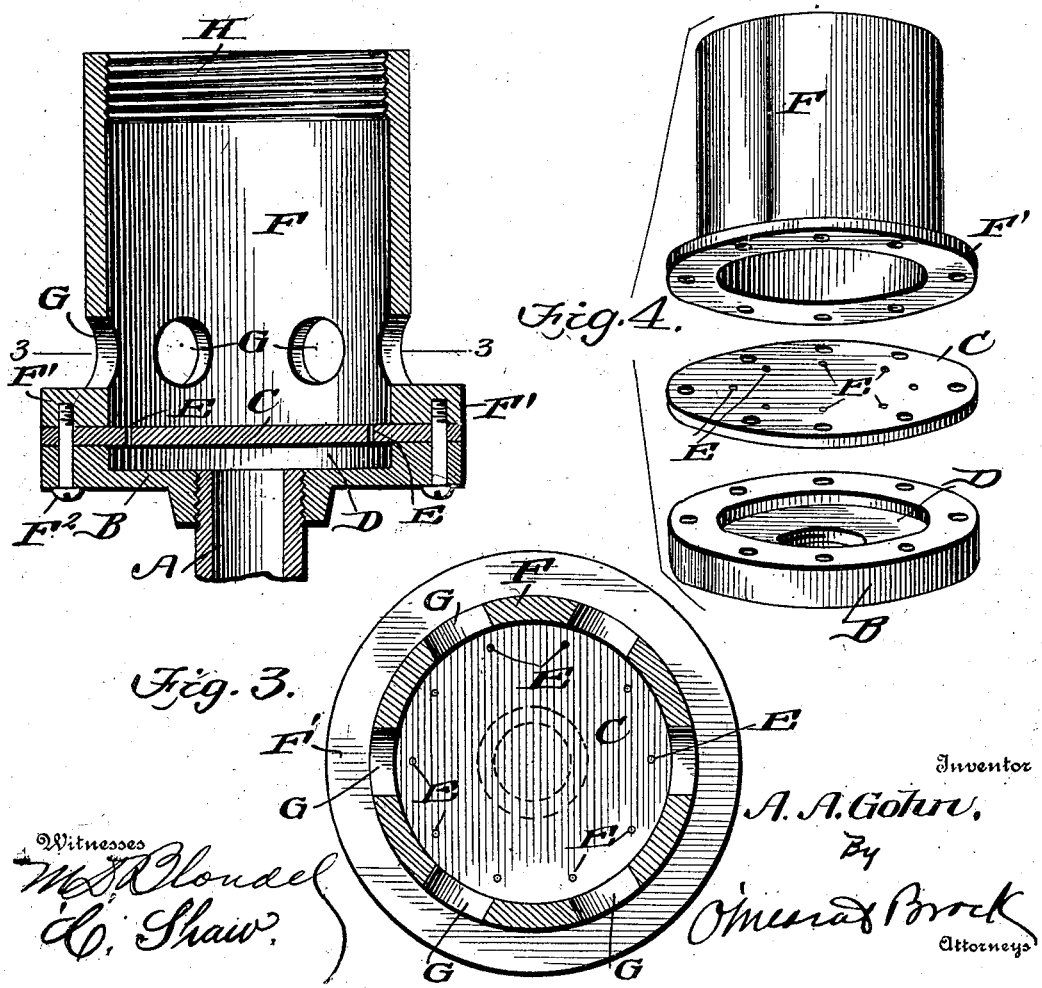

No. 753,975.

Patented March 8, 1904.

UNITED STATES PATENT OFFICE.

ALFRED ALVIN GOHN, OF WARREN, PENNSYLVANIA.

GAS-MIXER.

SPECIFICATION forming part of Letters Patent No. 753,975, dated March 8, 1904.

Application filed May 9, 1903. Serial No. 156,464. (No model.)

*To all whom it may concern:*

Be it known that I, ALFRED ALVIN GOHN, a citizen of the United States, residing at Warren, in the county of Warren and State of Pennsylvania, have invented a new and useful Gas-Mixer, of which the following is a specification.

This invention is an improved construction of gas-mixer, the object being to provide a device by means of which a maximum quantity of air can be mixed with a minimum quantity of gas, thereby producing an exceedingly hot and almost colorless flame.

With this object in view the invention consists in the novel features of construction, combination, and arrangement, all of which will be fully described hereinafter and pointed out in the claim.

In the drawings forming a part of this specification, Figure 1 is a perspective view showing a gas-mixer constructed in accordance with my invention. Fig. 2 is a vertical sectional view of the same. Fig. 3 is a horizontal sectional view on the line 3 3 of Fig. 2. Fig. 4 is a view showing the several parts of the device separated.

Referring to the drawings, A indicates the gas-supply pipe, which screws into the central aperture of a shallow circular cup B, upon which is arranged a flat plate C, which serves as a top or cover for the cup B, thereby providing a gas-chamber D. This plate C has a plurality of apertures E adjacent the outer edges of the gas-chamber D, said apertures being preferably arranged in a circle and are exceedingly small in diameter.

A cylindrical shell F, having an outwardly-extending flange F' at the lower end thereof, is securely connected to the plate C and cup B by means of bolts F², which pass upwardly through the rim of the cup B, through the plate C, and into the flange F' of the shell F. The shell F has a series of round openings G produced in the sides thereof adjacent the lower end, said holes serving to let the air into the shell and wherein the said air is mixed or commingled with the gas, which passes from the gas-chamber D through the apertures E into the mixing chamber or shell F. The upper end of the shell is threaded at H to receive the burner or burner-pipe.

It will thus be seen that I provide an exceedingly simple and efficient construction of mixer especially adapted for carrying out the object for which it is intended.

Having thus fully described my invention, what I claim as new, and desire to secure by Letters Patent, is—

A gas-mixer comprising a shallow cup, a plate arranged upon the top of the cup, and having a series of apertures adjacent the edges of the cup, a shell having a flange and resting upon the plate, said shell having a series of openings in the side thereof, adjacent the lower end thereof, and the bolts for connecting the cup, plate, and shell, substantially as described.

ALFRED ALVIN GOHN.

Witnesses:
CLINTON B. GIBSON,
W. S. CLARK.